United States Patent Office 3,030,345
Patented Apr. 17, 1962

3,030,345
PROCESS FOR PRODUCING SULFUR-
CONTAINING POLYMERS
Walter Rottig, Oberhausen-Sterkrade-Nord, Germany, assignor to Ruhrchemie Aktiengesellschaft, Oberhausen-Holten, Germany
No Drawing. Filed Apr. 27, 1959, Ser. No. 808,898
Claims priority, application Germany May 2, 1958
5 Claims. (Cl. 260—79.5)

The treatment of polyolefins, such as, for example, polyethylene, with finely divided sulfur at elevated temperatures while simultaneously subjecting them to a mechancial treatment is known. This treatment results in products which exhibit improved characteristics in several respects as compared with polymers which contain no sulfur.

It has been found that a still further improvement can be obtained. In accordance with the inventon, improved sulfur-containing polyolefins, particularly sulfur-containing polymers of ethylene and/or propylene are obtained by allowing chlorine compounds of sulfur, particularly sulfur chloride, $S_2Cl_2$, to act upon the polymers. This process is applied with particular advantage to the processing of those polyolefins as polyethylene, polypropylene or ethylene-propylene copolymers, which have been produced at pressures up to about 100 kg./cm.$^2$ and temperatures up to about 100° C. in the presence of catalysts consisting of mixtures of organometallic compounds, particularly aluminum alkyl compounds or aluminum alkyl halides, with compounds of metals of the 4th to 6th subgroups of the periodic table, particularly titanium halides. It is to be understood, however, that the process of the invention is not limited to polymers obtained by this process but is also applicable to other polyolefins.

When comparing the sulfur-containing polymers produced by prior art processes with those obtained by the process of the invention, the latter show a considerably lighter color. Moreover, the mechanical properties are highly improved as compared with prior art products and the disadvantage of products prepared with the use of elemental sulfur to contain certain amounts of free sulfur which is harmful in many types of processing is eliminated. There is also a definite improvement in the odor of the products prepared in accordance with the invention. Their odor is very trifling as compared with products prepared with the use of elemental sulfur.

In the practice of the present invention the process is carried out, for example, by suspending polyethylene, polypropylne or ethylene-propylene copolymers with sulfur chloride in a solution which, for example, consists of chlorinated hydrocarbons and contains the quantity desired of sulfur chloride using an appropriate stirrer and heating the suspension for a certain period of time at temperatures in excess of 50° C. and preferably in excess of 100° C. The boiling range of the chlorinated hydrocarbons used which should evaporate to as low an extent as is possible during the treatment is dependent upon the temperature used. The treating period may be as short as a few minutes in several cases, the preferred treating period being about 15 to 150 minutes depending upon the particular range of temperatures. Upon completion of the reaction, the mixture is filtered and the remaining polyethylene, polypropylene or ethylene-propylene copolymer is treated to remove residual solvents and small amounts of hydrochloric acid, this treatment being effected with steam. Instead of steam, inert gases, e.g. nitrogen, may be used. Under certain circumstances, low boiling organic compounds, e.g. aliphatic alcohols, amines, acids, etc., may be used for removing residual solvents. A subsequent treatment is likewise necessary in this case.

It is also possible to effect the treatment, e.g. with sulfur chloride, without the use of solvents using mechanical stirring devices or mixers, kneaders, mills or similar devices and to achieve the effect desired of the incorporation of sulfur in the polyethylene, polypropylene or similar polyolefins. When effecting the treatment by this method, increased temperatures, e.g. in excess of 80° C. up to about 150° C., are likewise preferably for accelerating the absorption of sulfur.

*Example*

The experiments described below were carried out with the use of a polyethylene prepared by the so-called Ziegler process at atmospheric pressure and having a molecular weight of 50,000 (measured viscosimetrically) and an ash content of 0.06%.

200 g.-samples of this material were thoroughly mixed with 42, 21, 11, 5 and 2.7 grams, respectively, of sulfur chloride, $S_2Cl_2$, using a mechanical stirrer. The mixture placed into a glass-lined dish in a layer depth of about 1 centimeter was heated for 30 minutes at a temperature of 135° C. in a heating cabinet under a nitrogen atmosphere. Thereafter, the composition was milled on a calender and subsequently comminuted in a crushing apparatus.

The sulfur content of the samples listed in the order mentioned above was as follows:

1.7%        0.42%
0.94%       0.2%
0.52%

I claim:
1. A process for the production of sulfur-containing polyolefins, selected from the group consisting of polyethylene, polypropylene and ethylene-propylene copolymers, which consists of bringing said polyolefins in intimate contact with $S_2Cl_2$ at temperatures above 50° C. and up to 150° C. for 15 to 150 minutes.

2. A process for the production of sulfur-containing polyolefins, selected from the group consisting of polyethylene, polypropylene and ethylene-propylene copolymers, which consists of bringing said polyolefins in intimate contact with $S_2Cl_2$, in amounts of 1.35 to 24 parts by weight of said polyolefins, for 15 to 150 minutes at temperatures above 50° C. and up to 150° C.

3. A process for the production of sulfur-containing polyolefins, selected from the group consisting of polyethylene, polypropylene and ethylene-propylene copolymers, which consists of suspending said polyolefins in a chlorinated hydrocarbon, introducing $S_2Cl_2$ into said suspension, heating the mixture thus obtained at temperatures above 50° C. and up to 150° C. for 15 to 150 minutes, filtering the chlorine-free, sulfur-containing polyolefins thus obtained, and removing the residual solvent and traces of hydrochloric acid formed therefrom.

4. A process for the production of sulfur-containing polyolefins, selected from the group consisting of polyethylene, polypropylene and ethylene-propylene copolymers, which consists of suspending said polyolefins in a chlorinated hydrocarbon, introducing $S_2Cl_2$ into said suspension in amounts ranging from 1.35 to 24 parts by weight of said polyolefins, heating the mixture thus obtained under constant agitation at temperatures above 50°

C. and up to 150° C. for 15 to 150 minutes, filtering the chlorine-free, sulfur-containing polyolefins thus obtained, and removing residual solvent and traces of hydrochloric acid formed by a treatment with a substance selected from the group consisting of steam and an inert gas.

5. A process for the production of sulfur-containing polyolefins, selected from the group consisting of polyethylene, polypropylene and ethylene-propylene copolymers, which consists of intimately mixing said polyolefins with $S_2Cl_2$ in amounts ranging from 1.35 to 24 parts by weight of said polyolefins, heating the mixture thus obtained at temperatures above 80° C. and up to 150° C. for 15 to 150 minutes in a nitrogen atmosphere, milling the mixture and comminuting the same.

References Cited in the file of this patent

UNITED STATES PATENTS

| | | |
|---|---|---|
| 2,212,786 | McQueen | Aug. 27, 1940 |
| 2,283,627 | Gleason | May 19, 1942 |

OTHER REFERENCES

Le Bras: Rubber; Fundamentals of Its Science and Technology, Chem. Publ. Co., New York (1957), pages 170 and 263.